US006626638B2

United States Patent
Rosefsky

(10) Patent No.: US 6,626,638 B2
(45) Date of Patent: Sep. 30, 2003

(54) RIBBON DRIVE POWER GENERATION FOR VARIABLE FLOW CONDITIONS

(76) Inventor: Jonathan B. Rosefsky, 251 W. Montgomery Ave., Haverford, PA (US) 19041

(*) Notice: Subject to any disclaimer, the term of this patent is extended or adjusted under 35 U.S.C. 154(b) by 0 days.

(21) Appl. No.: 10/057,146

(22) Filed: Jan. 25, 2002

(65) Prior Publication Data

US 2002/0062644 A1 May 30, 2002

Related U.S. Application Data

(63) Continuation-in-part of application No. 09/628,786, filed on Jul. 29, 2000.
(60) Provisional application No. 60/146,122, filed on Jul. 29, 1999.

(51) Int. Cl.[7] ................................................. F03B 13/10
(52) U.S. Cl. .......................... 415/4.3; 415/4.5; 415/7; 415/72; 415/73; 415/60; 415/908
(58) Field of Search ......................... 415/4.3, 4.5, 7, 415/8, 72, 73, 908, 60; 290/43, 44, 54, 55

(56) References Cited

U.S. PATENT DOCUMENTS

| 119,155 A | 9/1871 | Kolb | |
|---|---|---|---|
| 471,671 A | 2/1892 | Stants | |
| 475,826 A | 5/1892 | Street | |
| 815,302 A | 3/1906 | Marvin | |
| 1,816,971 A | 8/1931 | Hoff et al. | |
| 2,334,302 A | 11/1943 | Akins | |
| 2,568,903 A | 9/1951 | Vassar | 115/34 |
| 2,656,809 A | 10/1953 | Frasure | 114/151 |
| 3,070,061 A | 12/1962 | Rightmyer | 115/34 |
| 3,141,439 A | 7/1964 | Liston | 115/16 |
| 3,482,402 A | 12/1969 | Anthoney, Sr. | 60/221 |
| 4,151,081 A | 4/1979 | Bolli et al. | |
| 4,213,734 A | * 7/1980 | Lagg | 415/4.3 |
| 4,218,175 A | * 8/1980 | Carpenter | 415/219.1 |

(List continued on next page.)

FOREIGN PATENT DOCUMENTS

| DE | 298 12 429 | 7/1999 |
|---|---|---|
| FR | 490.000 | 11/1917 |
| FR | 757.930 | 5/1932 |
| FR | 775.605 | 6/1934 |
| FR | 2.160.692 | 10/1971 |

(List continued on next page.)

Primary Examiner—Ninh H. Nguyen
(74) Attorney, Agent, or Firm—Roberts, Abokhair & Mardula, LLC

(57) ABSTRACT

The ribbon drive generation apparatus is comprised of a ribbon-like curved shape, composed either of metal or other suitable material, attached to a central axle with the complete apparatus being contained in a tube having a constant diameter for the length of the tube. A front portion of the tube has a pivot or tether and the rear portion of the tube has a drag means, such as fins, so as to cause rotation of the tube until it is oriented parallel to the flow. In another embodiment of the present invention, the electrical output of the ribbon drive generation apparatus is connected to a storage battery so as to store energy in times of high flow and make up for generating deficiencies during times of lesser flow. In yet another embodiment of the present invention, plural generating stages are serially arranged to adapt to flow variation and provide smooth start-up. Bypass vents and coupling means are located between each stage. Flow operates a first stage and exits via the bypass until a sufficient rotation is achieved. The coupling is then engaged and the bypass closed in order to operate the subsequent stage. In this manner, the generator of the present invention can be operated in stages.

18 Claims, 3 Drawing Sheets

U.S. PATENT DOCUMENTS

| | | | |
|---|---|---|---|
| 4,222,231 A | | 9/1980 | Linn .................... 60/39.45 |
| 4,258,271 A | * | 3/1981 | Chappell et al. ............ 290/54 |
| 4,317,330 A | | 3/1982 | Brankovics |
| 4,373,919 A | | 2/1983 | Stangeland ................ 440/47 |
| 4,496,282 A | | 1/1985 | Gokhman |
| 4,500,259 A | | 2/1985 | Schumacher |
| 4,634,389 A | | 1/1987 | Eptaminitakis ............ 440/53 |
| 4,816,697 A | * | 3/1989 | Nalbandyan et al. ........ 290/54 |
| 5,139,391 A | | 8/1992 | Carrouset |
| 5,181,868 A | | 1/1993 | Gabriel ..................... 440/38 |
| 5,240,374 A | | 8/1993 | Speer ....................... 416/140 |
| 5,244,425 A | | 9/1993 | Tasaki et al. .............. 440/47 |
| 5,292,270 A | | 3/1994 | Tucker et al. ............. 440/82 |
| 5,324,216 A | | 6/1994 | Toyohara et al. .......... 440/47 |
| 5,383,802 A | | 1/1995 | Nicholson ................ 440/38 |
| 5,417,597 A | | 5/1995 | Levedahl ................... 440/6 |
| 5,558,509 A | | 9/1996 | Jirnov et al. .............. 415/15 |
| 6,051,892 A | * | 4/2000 | Toal, Sr. .................... 290/43 |
| 6,357,997 B1 | * | 3/2002 | Rosefsky ................... 415/60 |

FOREIGN PATENT DOCUMENTS

| | | |
|---|---|---|
| FR | 2 749 558 | 12/1997 |
| JP | 5-294282 | 5/1993 |
| JP | 6-191482 | 6/1994 |
| WO | WO 87/01353 | 12/1987 |
| WO | WO 95/23088 | 8/1995 |
| WO | WO 95/24562 | 9/1995 |

* cited by examiner

RIBBON DRIVE POWER GENERATION FOR VARIABLE FLOW CONDITIONS

RELATIONSHIP TO PRIOR APPLICATIONS

This application is a continuation-in-part of U.S. application Ser. No. 09/628,786, filed Jul. 29, 2000, which claims the benefit of U.S. Provisional Application No. 60/146,122, filed Jul. 29, 1999, both of which are incorporated herein by reference.

FIELD OF THE INVENTION

This invention relates generally to an apparatus for producing hydroelectric power using a ribbon drive mechanism. More particularly, the present invention is a ribbon drive electrical power generator with flow handling improvements related to self-orientation and staged start-up.

BACKGROUND OF THE INVENTION

Co-pending U.S. application Ser. No. 09/628,786 discloses a ribbon drive power generation system and use in a peak shaving system. However, the modular nature of the ribbon drive power generator allows additional applications, such as use in free flowing currents and use in variable flow environments.

Therefore, what would be useful would be a system capable of improving operation of the ribbon drive power generator in free flowing currents and in variable flow environments.

SUMMARY OF THE INVENTION

As discussed more fully below, the ribbon drive power generation apparatus of the present invention includes improvements related to orientation of the system within a flow and handling variable flow conditions. A front-mounted pivot or tether and a rear-mounted drag means acts together to orient the generator within a flow. The use of a battery storage means and multiple stages which allow the bypass of downstream stages provides improved utility under variable flow conditions.

It is an object of the present invention to create a hydropower generation system that involves significantly decreased outlays of capital for facilities construction compared to that presently required.

It is a further object of the present invention to create a hydropower generation system that is adaptable to variable flow conditions.

It is a further object of the present invention to create a hydropower generation system that is self-orienting.

In a first embodiment of the present invention, the ribbon drive generation apparatus is comprised of a ribbon-like curved shape, composed either of metal or other suitable material, attached to a central axle with the complete apparatus being contained in a tube having a constant diameter for the length of the tube. A front portion of the tube has a pivot or tether and the rear portion of the tube has a drag means, such as fins, so as to cause rotation of the tube until it is oriented parallel to the flow.

In another embodiment of the present invention, the electrical output of the ribbon drive generation apparatus is connected to a storage battery so as to store energy in times of high flow and make up for generating deficiencies during times of lesser flow.

In yet another embodiment of the present invention, plural generating stages are serially arranged to adapt to flow variation and provide smooth start-up. Bypass vents and coupling means are located between each stage. Flow operates a first stage and exits via the bypass until a sufficient rotation is achieved. The coupling is then engaged and the bypass closed in order to operate the subsequent stage. In this manner, the generator of the present invention can be operated in stages.

DETAILED DESCRIPTION OF THE INVENTION

Figure 3:
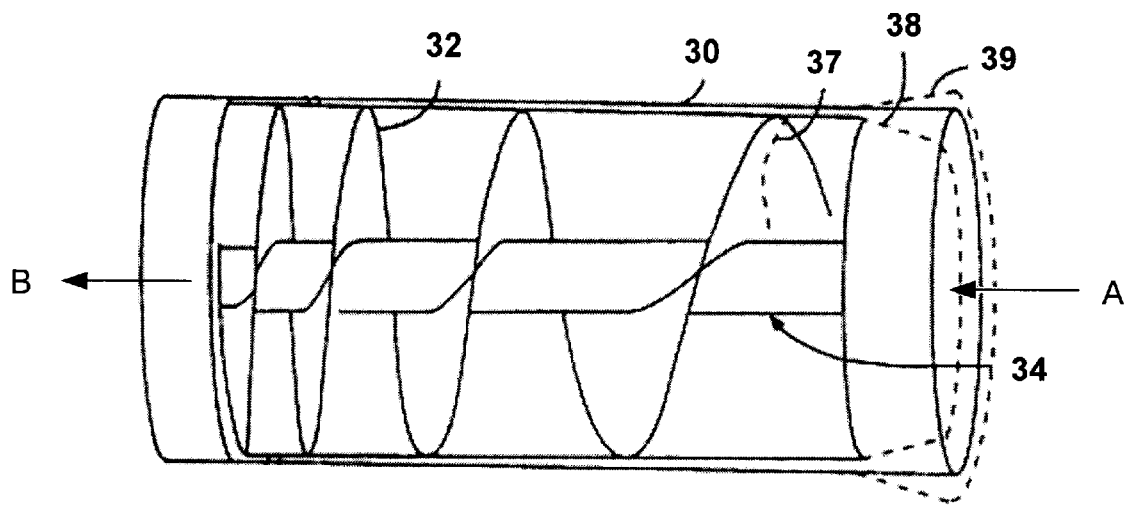
FIG. 3 illustrates the basic ribbon elements of the present invention.

Referring to FIG. 3, the apparatus interior design is illustrated. The central axle 34 has a ribbon 32 attached to it. Visually, this representation appears much like the thread of a screw attached to a central core. The ribbon rotates within a containment tube 30. Water flows through the power generation system in the direction of the arrows as the entire corkscrew-like design rotates within the containment tube 30.

Water initially enters the containment tube 30 at point A and encounters the low frequency coils, which present a gradual curve of approximately 30 degrees to the axial flow of the incoming water. The ribbon changes, progressing to a tightly curved angle (high frequency coil) at the exit point for the water, with said angle at this point B being nearly perpendicular to the flow of water passing through the apparatus and thereby further reducing the velocity of the water passing through the apparatus (this angle is not meant as a limitation to the apparatus since other angles may prove to be beneficial).

This reduction of velocity of the water is a consequence of a transfer of energy from the water to the apparatus, thus turning the central axle 34 and ribbon 32 of the apparatus. Rotation of the ribbon-like apparatus is initiated at the low-frequency coil, with energy incrementally transferred as water, hitting the initial low frequency coil, sets the apparatus spinning slowly, progressing gradually to higher frequency coils with resultant higher rotational speed, finally contacting the terminal high frequency, tightly-curved coil where maximal energy transfer occurs.

The central axle 34 of the apparatus operates within a containment tube 30 to prevent loss of energy to the sides as would be the case with a typical open hydraulic turbine type design. The central axle 34 of the apparatus could be attached to and used to power any of a number of means of electrical power generation. In this manner, power could be transmitted from the central axle 34 of the power generation apparatus to the means of electrical power generation by the use of gears, pulleys, or any of a variety of combinations of techniques. Alternately, the system could be configured to bypass the shaft and directly induce electricity, although this is still considered a "generator means" for the purposes of this disclosure.

The curved ribbon may be cupped 37 and made of metal, plastic, composite or other sturdy material. The frequency of the ribbon may be fixed (static) or variable (dynamic or adjustable). It can be made variable by segmenting the ribbon into a contiguous length of hinged, interlocking, or overlapping blades, which are movable by reason of linkages or sliding splines (or other means to those skilled in the art) along the length of the ribbon band, or by linear elongation or contraction. The innermost central edge of the ribbon is attached to the central axle, which can include tubular sections that slide longitudinally or include slots within which the innermost edge attachment of the ribbon can be adjusted to slide, or by other methods. The material of the ribbon can have limited but finite flexibility/extensibility, to permit adjustment as the flow source varies. The tube 30 can also have small portions 38, 39 of varying diameter.

Figure 1:
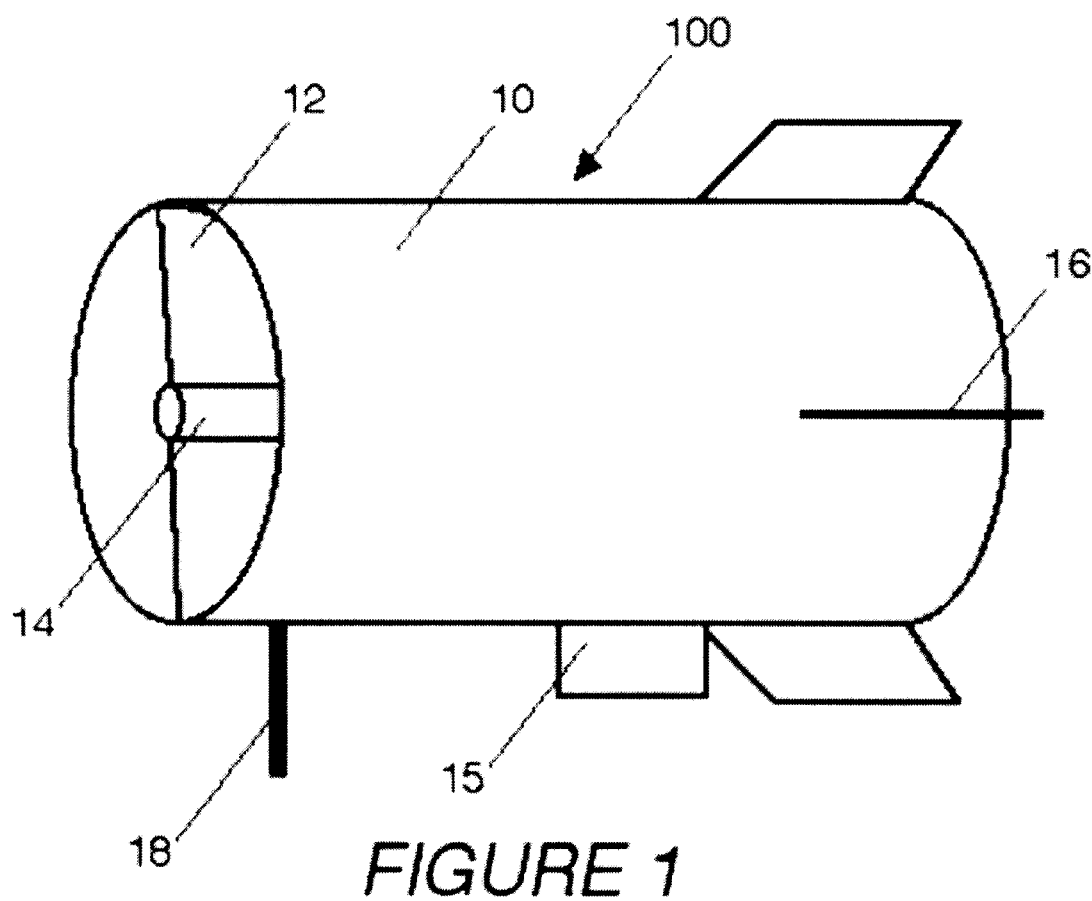
FIG. 1 illustrates the basic design of the self orienting power generation system of the present invention.

Referring to FIG. 1, a basic implementation of ribbon drive generator 100 of the self-orienting ribbon for the present invention is illustrated. When tube 10 is placed in a flow, ribbon 12 rotates shaft 14 that is coupled to a generator means 15 to generate electricity. A means 18, such as a pivot, is attached to a front part of tube 10 and fins 16 or other drag means of conventional design are attached to a rear part of tube 10. When means 18 is a pivot and the ribbon drive generator 100 is placed into a flow, the drag forces acting upon fins 16 will cause the tube 10 to rotate about the pivot 18 until it is aligned parallel to the flow. This is a passive control method.

In certain situations, it may be desirable to use an active control method such as a mechanical or electromechanical feedback system to orient the ribbon drive generator 100 to be parallel to the flow. Options include, but are not limited to, movable control surfaces (fins 16) or a movable support (means 18) that are operated by conventional control systems (not shown, such as flow sensors or other flow direction sensing means).

Figure 2:
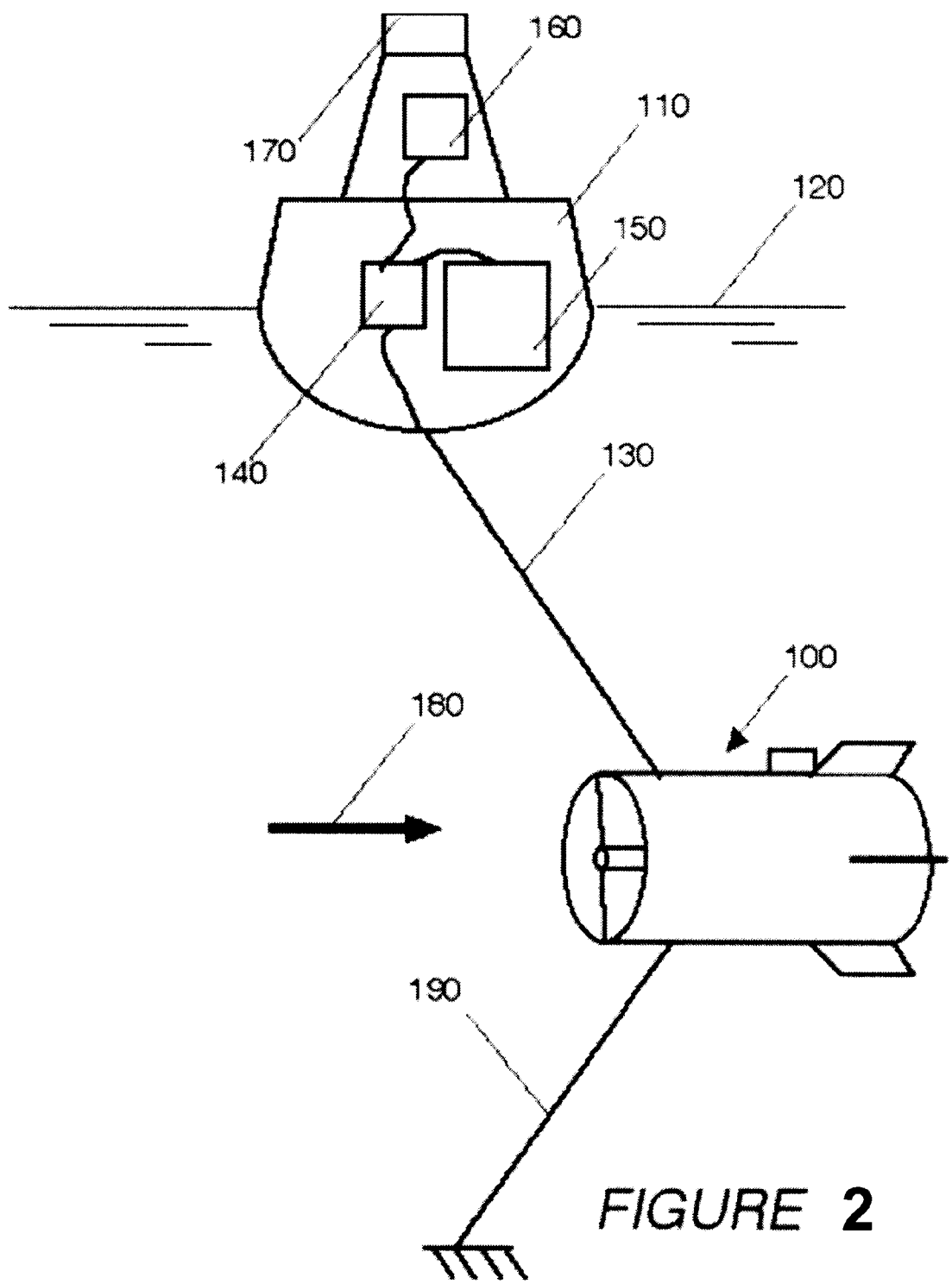
FIG. 2 illustrates another embodiment of the present invention.

FIG. 2 illustrates another implementation of ribbon drive generator 100, wherein the generator 100 can be used to power a light or bell 170 on buoy 110 floating in a channel 120 having flow 180. A combination tether and power delivery line 130 is attached to a front part of generator 100 and fins or other drag means of conventional design are attached to a rear part. An anchor line 190 keeps the buoy in position and acts with tether 130 to align the generator 100 with flow 180 to generate power. Generated power from 100 is then delivered via line 130 to a power management unit (PMU) 140 to power bell/light 170. Excess electrical energy is sent to storage battery 150. An optional solar power source 160 can also be attached to the PMU 140.

Figure 4:
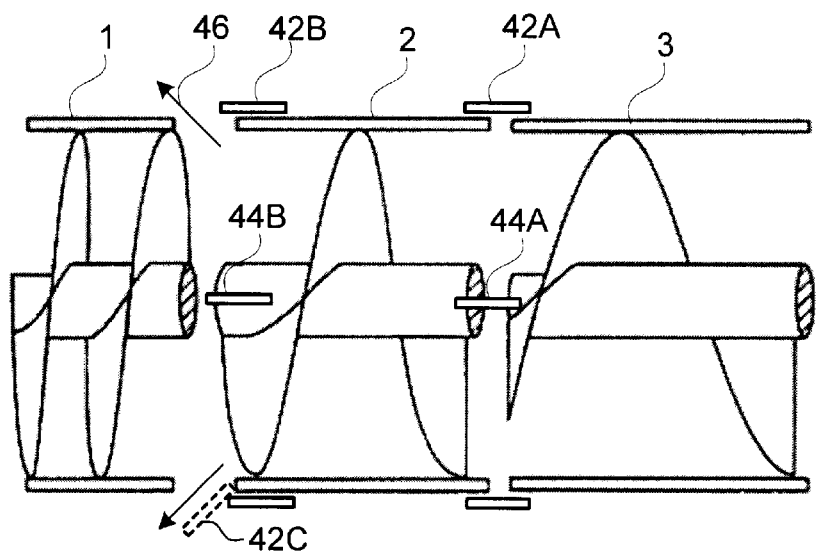
FIG. 4 illustrates a staged generator with vents in accordance with another embodiment of the present invention.

FIG. 4 illustrates the staged embodiment of the present invention having an initial low frequency coil section 3, a medium frequency coil section 2, and a final high frequency coil section 1. As shown, initial section 3 and section 2 have already been initiated and coupled via the closure of vent 42A and the attachment of coupling 44A. Section 1 is being bypassed by the uncoupling of coupling means 44B and the opening of vent 42B so as to allow fluid exit at 46. Vents 42A–B are illustrated as sliding ring sections, but this in not meant as a limitation. As shown at 42C, other means, such as pivoting vents, can also be used.

Coupling means 44A–B can be of convention design, such as viscous couplings, mechanically or electrically actuated clutches, movable splines, etc.

The apparatus could be employed in a variety of sizes based on the particular space or configuration restrictions of the area(s) in which it would be employed. The apparatus could also be employed in a variety of teaming arrangements in pairs, threes, fours, and so forth as well as in parallel or series based on the specific requirements of a particular installation. This flexibility would allow hydropower generation efforts to be employed in areas previously deemed unsuitable for such activities due to insufficient water depth, insufficient water volume, and/or insufficient speed of water flow.

The scalability and modular nature of the present invention allow it to meet the objective of significantly decreased outlays of capital for facilities construction compared to that presently required by currently available technologies.

The scalability and modular nature of the present invention also allow it to meet the objective of requiring significantly less volume of water thereby alleviating the need for the extensive flooding and rendering unusable of large tracts of land to contain the vast amounts of water required for currently available technologies.

The scalability and modular nature of the present invention allow it to meet the objective of being capable of functioning in areas where water depth, water volume, and/or speed of water flow have previously been deemed insufficient to support hydropower generation efforts.

The progressively increasing frequency of the coils on the ribbon provide for the efficient transfer of linear energy to rotational energy along the entire length of the ribbon.

I claim:

1. A ribbon drive power generation system comprising:
   a tube having an intake at a first end and an outlet at a second end;
   at least one rotatable ribbon formed of coils extending in a helical manner from the first end to the second end of the tube, wherein a frequency of coils per unit length of tube increases from the first end to the second end of the tube;
   a central, axial shaft in said tube, said ribbon being fixed at an inner edge to said shaft and extends radially outward to form an outer edge adjacent an inner wall of the tube;
   generator means associated with said shaft and ribbon to convert rotation thereof into electrical power; and
   means to self-orient the tube with a fluid flow.

2. The ribbon drive power generation system of claim 1, wherein said means to self-orient the tube with a fluid flow comprises a front attachment on said tube and drag means on a rear of the tube.

3. The ribbon drive power generation system of claim 2, wherein said front attachment is selected from the group consisting of a tether and a pivot.

4. The ribbon drive power generation system of claim 2, wherein said drag means are fins.

5. The ribbon drive power generation system of claim 1, wherein said means to self-orient the tube with a fluid flow comprises an actively controlled support means.

6. The ribbon drive power generation system of claim 1, wherein said means to self-orient the tube with a fluid flow comprises actively controlled movable control surfaces.

7. The ribbon drive power generation system of claim 1, wherein said ribbon is cupped to have a concave curvature in a direction facing the inlet.

8. The ribbon drive power generation system of claim 1, wherein the ribbon is formed of rigid material selected from the group consisting of metal, composite materials, plastic polymer, and ceramic.

9. The ribbon drive power generation system of claim 1, wherein the tube or a portion varies in diameter.

10. The ribbon drive power generation system of claim 1, further comprising a storage battery connected to said generator means.

11. A ribbon drive power generation system comprising:
a plurality of serially staged sections, each section comprising:
- a tube having an intake at a first end and an outlet at a second end;
- at least one rotatable ribbon formed of coils extending in a helical manner from the first end to the second end of the tube, wherein a frequency of coils per unit length of tube increases from the first end to the second end of the tube;
- a central, axial shaft in said tube, said ribbon being fixed at an inner edge to said shaft and extends radially outward to form an outer edge adjacent an inner wall of the tube; and
- generator means associated with said shaft and ribbon to convert rotation thereof into electrical power, wherein a shaft coupling and a fluid vent is located between each serially staged section.

12. The ribbon drive power generation system of claim 11, wherein said ribbons are cupped to have a concave curvature in a direction facing the inlet.

13. The ribbon drive power generation system of claim 11, wherein the ribbons are formed of rigid material selected from the group consisting of metal, composite materials, plastic polymer, and ceramic.

14. A method of operating the apparatus of claim 11, comprising:
initiating rotation of the first section with the shaft coupling between the first section and second section uncoupled and the fluid vent between the first section and second section open.

15. The method of claim 14, further comprising attaching the shaft coupling between the first section and second section and closing the fluid vent between the first section and second section upon a shaft of the first section reaching a predetermined rotational speed.

16. The method of claim 15, further comprising attaching the shaft coupling between each subsequent section and closing the fluid vent between each subsequent section upon a shaft of the previous section reaching a desired rotational speed.

17. A ribbon drive power generation method comprising:
providing a tube having an intake at a first end and an outlet at a second end;

rotating at least one shaft mounted ribbon formed of coils extending in a helical manner from the first end to the second end of the tube, wherein a frequency of coils per unit length of tube increases from the first end to the second end of the tube;

self-orienting said tube with a flow of water to direct moving water into the first end;

decreasing an axial component of momentum of the water with the ribbon to cause rotation of the ribbon and shaft; and generating electrical power from said rotation.

18. The ribbon drive power generation method of claim 17, wherein self-orienting said tube is selected from the group consisting of passively orienting the tube with drag forces, actively orienting the tube with movable control surfaces, and actively orienting said tube with movable support means.

* * * * *